United States Patent
Dünnwald

(10) Patent No.: US 10,252,865 B2
(45) Date of Patent: Apr. 9, 2019

(54) DEVICE FOR STRIPPING MATERIAL FROM A CONVEYOR BELT OF A BELT CONVEYOR AND METHOD FOR INSTALLING SUCH A STRIPPING DEVICE

(71) Applicant: ScrapeTec GmbH, Kamp-Lintfort (DE)

(72) Inventor: Wilfried Dünnwald, Kamp-Lintfort (DE)

(73) Assignee: ScrapeTec GmbH, Kamp-Lintfort (DE)

( * ) Notice: Subject to any disclaimer, the term of this patent is extended or adjusted under 35 U.S.C. 154(b) by 0 days.

(21) Appl. No.: 15/249,789

(22) Filed: Aug. 29, 2016

(65) Prior Publication Data

US 2017/0057753 A1  Mar. 2, 2017

(30) Foreign Application Priority Data

Aug. 31, 2015  (DE) .......................... 10 2015 114 498

(51) Int. Cl.
| | | |
|---|---|---|
| B65G 45/00 | (2006.01) | |
| B65G 45/16 | (2006.01) | |
| B65G 45/10 | (2006.01) | |

(52) U.S. Cl.
CPC .................................... B65G 45/16 (2013.01)

(58) Field of Classification Search
None
See application file for complete search history.

(56) References Cited

U.S. PATENT DOCUMENTS

| | | | | |
|---|---|---|---|---|
| 6,443,294 B1* | 9/2002 | Brody | ................... | B65G 45/16 198/499 |
| 7,083,040 B2* | 8/2006 | Finger | ................... | B65G 45/12 198/497 |
| 8,528,724 B2 | 9/2013 | Dunnwald | | |
| 2004/0222065 A1* | 11/2004 | Meguro | ................ | B65G 45/12 198/497 |
| 2006/0201783 A1* | 9/2006 | Baldasari | ............... | B65G 45/16 198/499 |

FOREIGN PATENT DOCUMENTS

| | | | | |
|---|---|---|---|---|
| EP | 2257486 B1 | 6/2012 | | |
| GB | 1325519 A | * 8/1973 | ............. | B29D 29/06 |
| GB | 1325519 A | * 8/1973 | ............. | B29D 29/06 |

* cited by examiner

*Primary Examiner* — Kavel Singh
(74) *Attorney, Agent, or Firm* — The Webb Law Firm

(57) ABSTRACT

A device for stripping material from a conveyor belt conveyor. The device includes a stripping body which can be pulled against the conveyor belt by means of a carrying element, a fastening device, and a tensioning device for the carrying element. In an installed state the carrying element is connected to the fastening device at one of its end and is connected to the tensioning device at its other end. The tensioning device has a spring, a stop for supporting the spring and a traction rod. The traction rod is connected to the carrying element. The spring is arranged in a receptacle associated with one or more adjusting means defining a through opening as a passage for the traction rod. The receptacle or the respective adjusting means defines a reference point for setting a variable tensioning force which corresponds to a desired tensile force dependent upon said angle.

21 Claims, 8 Drawing Sheets

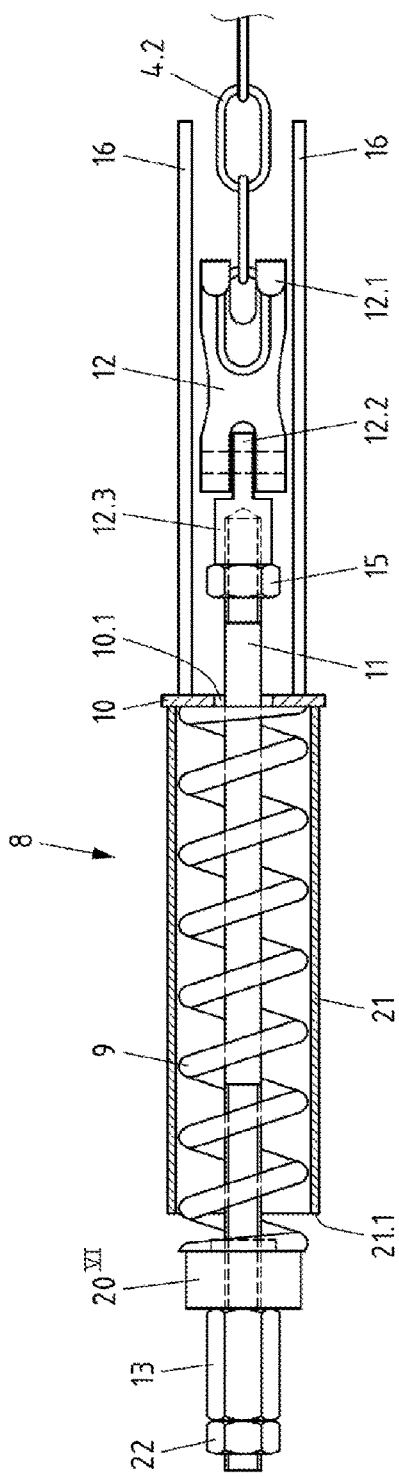
Fig.3
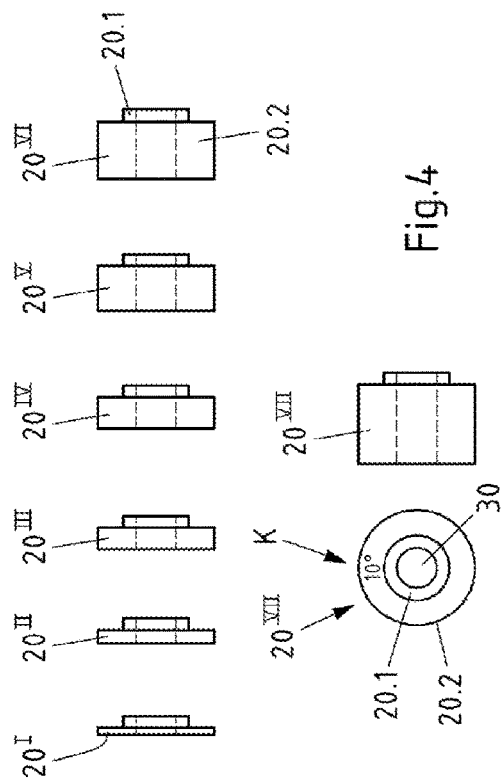
Fig.4
| Angle | Basic pretension in N | Difference from the basic pretension in N | Thickness in mm |
|---|---|---|---|
| 25° | 2000 | 0 | 2 |
| 22.5° | 2250 | 250 | 4 |
| 20° | 2750 | 750 | 8 |
| 17.5° | 3250 | 1250 | 12 |
| 15° | 3750 | 1750 | 18 |
| 12.5° | 4750 | 2750 | 24 |
| 10° | 6000 | 4000 | 34 |
Fig.5

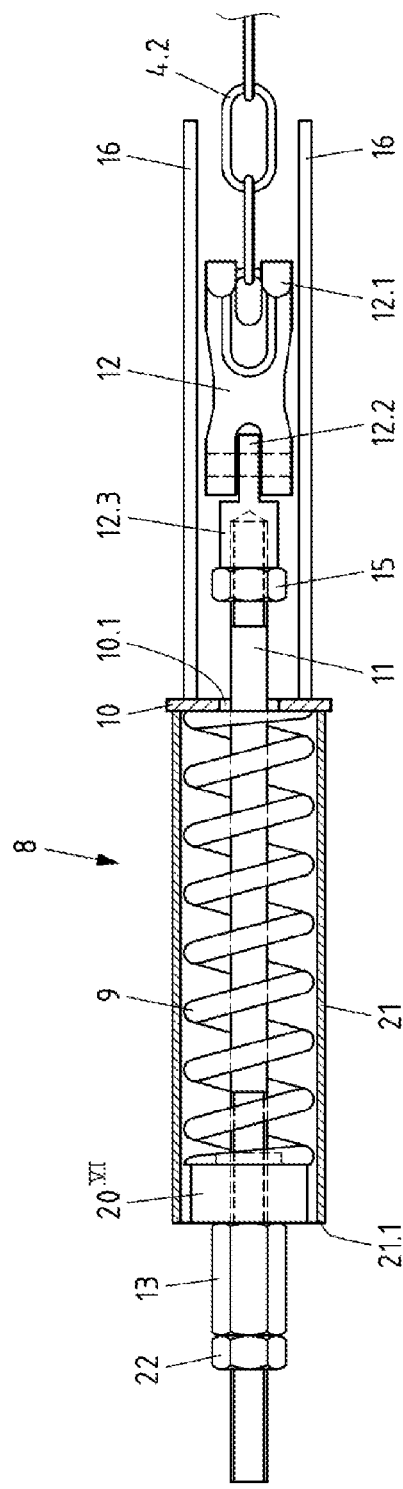
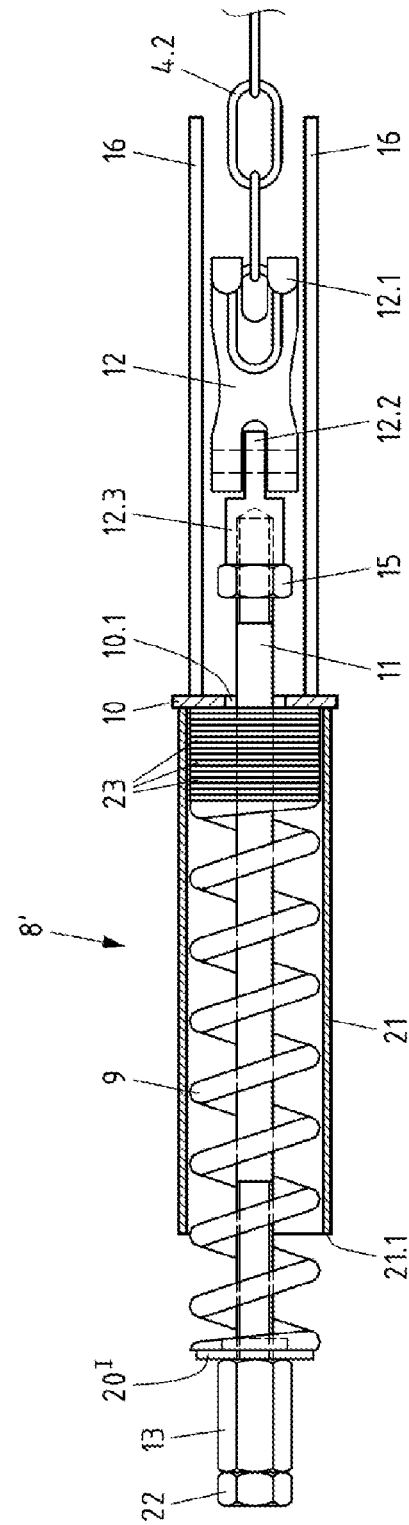
Fig.6
Fig.7

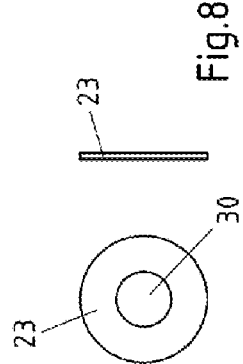
Fig. 8
| Angle | Basic pretension in N | Difference from the basic pretension in N | Number of discs |
|---|---|---|---|
| 25° | 2000 | 0 | 0 |
| 22.5° | 2250 | 250 | 1 |
| 20° | 2750 | 750 | 3 |
| 17.5° | 3250 | 1250 | 5 |
| 15° | 3750 | 1750 | 8 |
| 12.5° | 4750 | 2750 | 11 |
| 10° | 6000 | 4000 | 16 |
Fig. 9
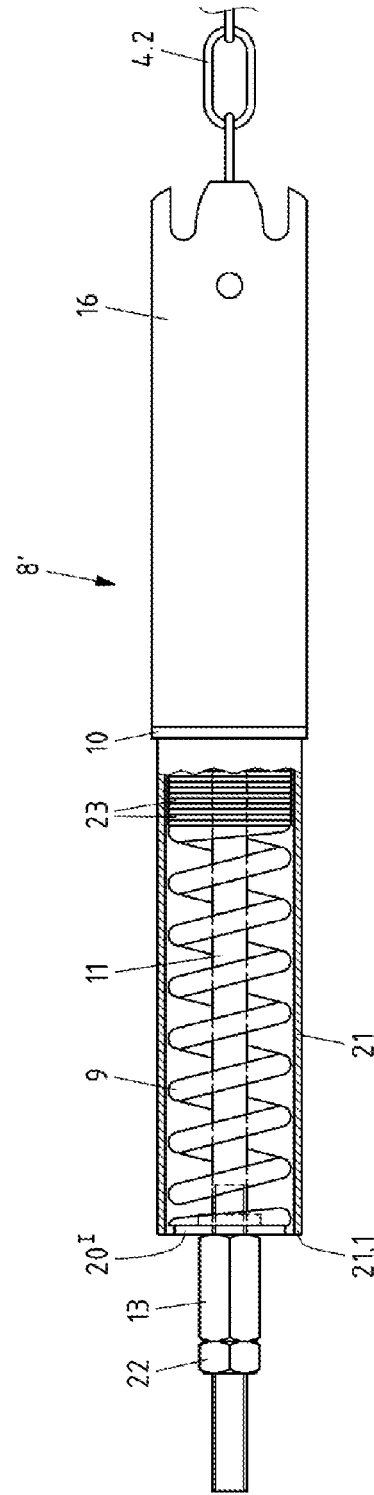
Fig. 10

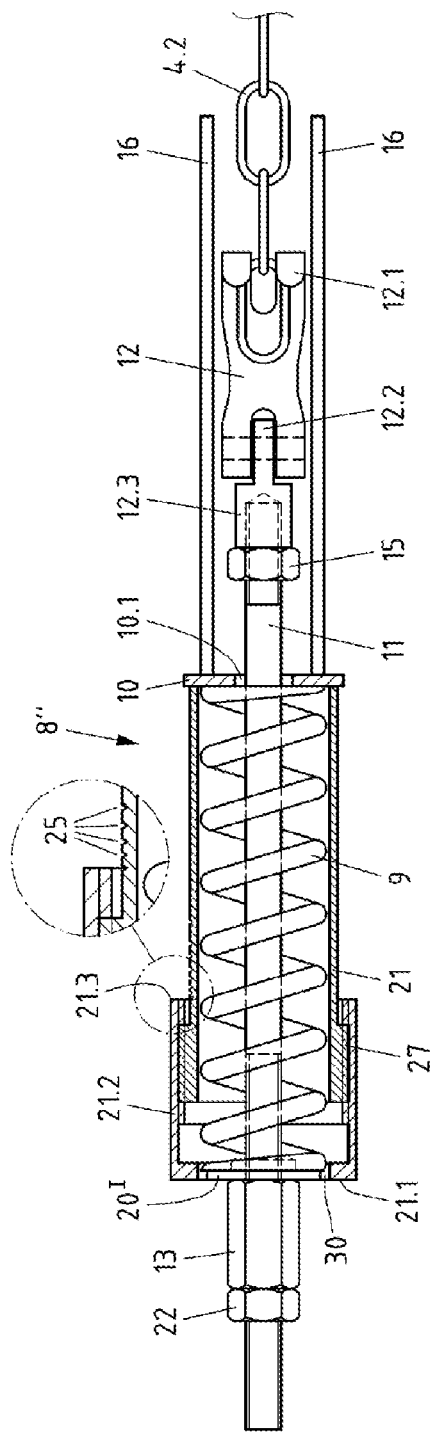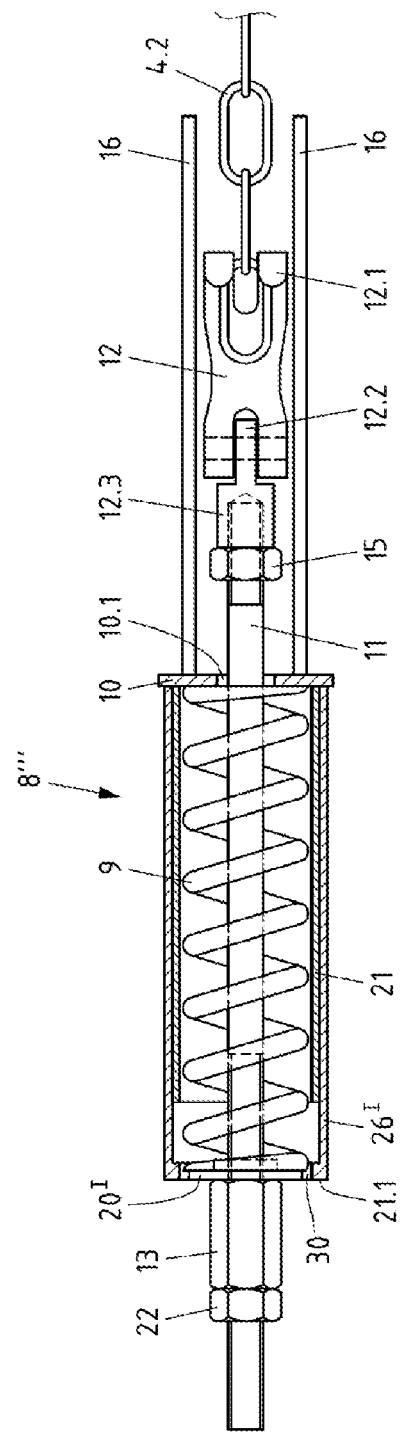
Fig. 11
Fig. 12

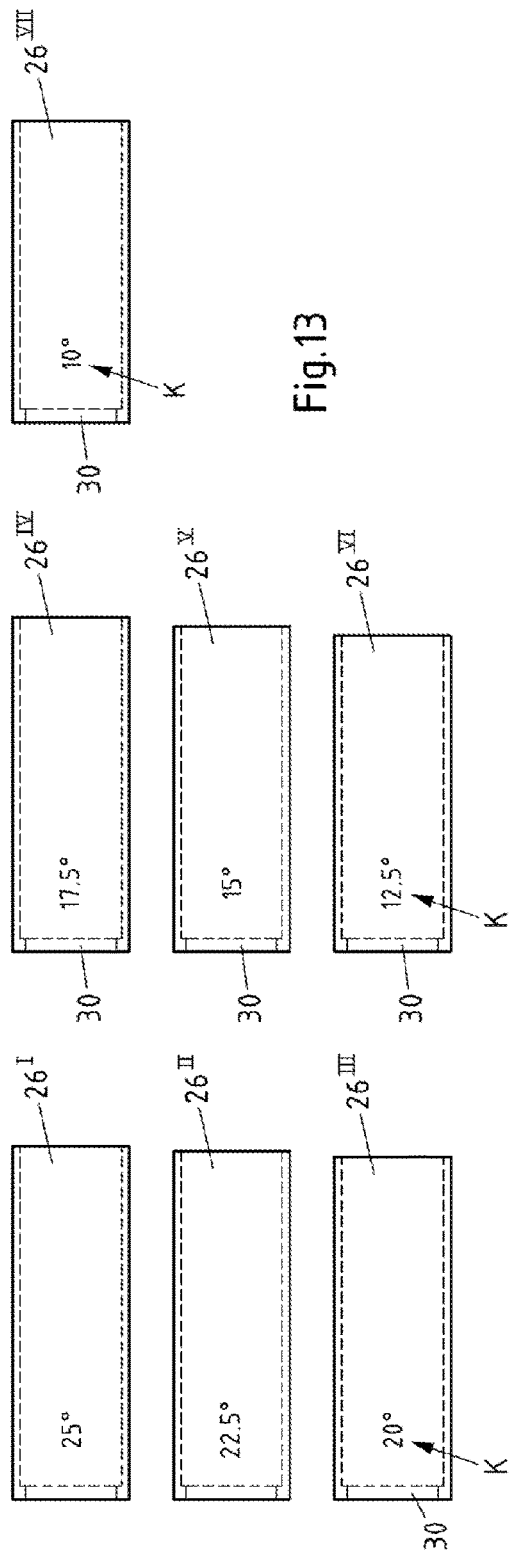

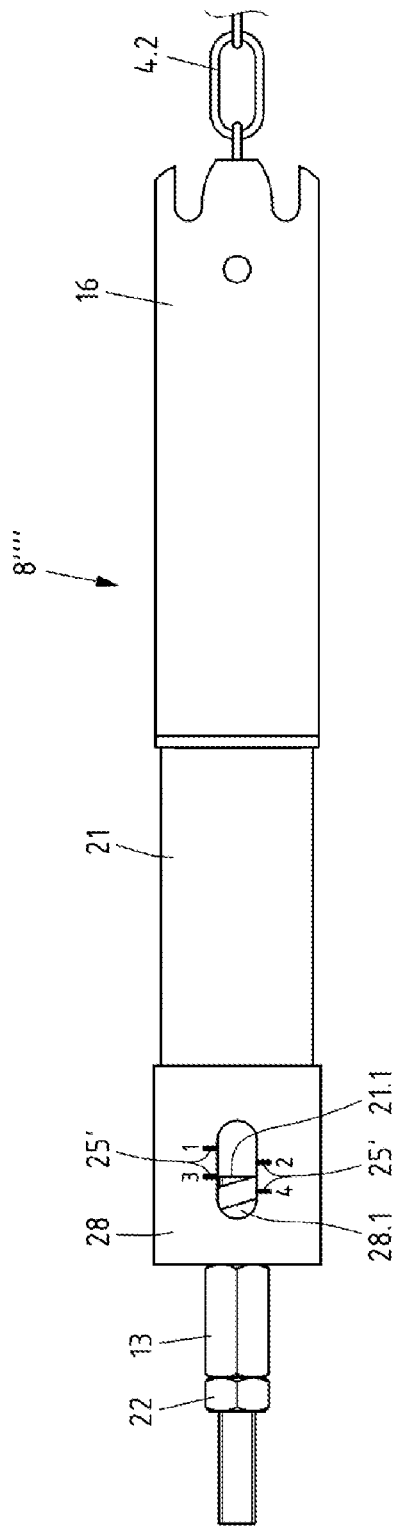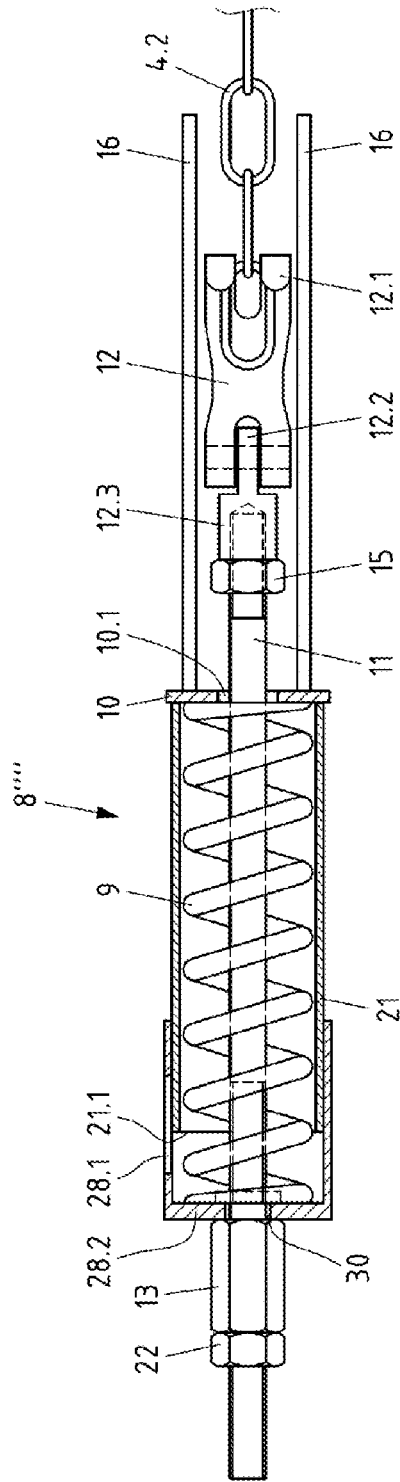

DEVICE FOR STRIPPING MATERIAL FROM A CONVEYOR BELT OF A BELT CONVEYOR AND METHOD FOR INSTALLING SUCH A STRIPPING DEVICE

CROSS-REFERENCE TO RELATED APPLICATION

This application claims priority to German Patent Application No. 10 2015 114 498.0 filed Aug. 31, 2015, the disclosure of which is hereby incorporated in its entirety by reference.

BACKGROUND OF THE INVENTION

Field of the Invention

The invention relates to a device for stripping material from a conveyor belt of a belt conveyor in a region of a curve of a discharge drum, below a discharge point of the belt conveyor, having a stripping body which is of one-part or multi-part configuration and is provided with a carrying element formed by a cable and/or a wire and/or a metal chain, by means of which the stripping body is or can be pulled against the conveyor belt, and having a fastening device and a tensioning device for the carrying element, wherein in the installed state the carrying element is arranged so that it encloses an acute angle (installation angle) with a straight line extending parallel to the axis of rotation of the discharge drum, and at one of its ends it is connected to the fastening device and at its other end it is connected to the tensioning device, wherein the tensioning device has a spring, preferably a helical spring, a stop for supporting the spring and a traction rod, and wherein the traction rod is connected to the carrying element and has a thread which is provided with a nut or a screw having a head.

Moreover, the invention relates to a method for installing a stripping device for stripping material from a conveyor belt of a belt conveyor in the region of the curve of a discharge drum, below the discharge point of the belt conveyor, wherein the stripping device has a stripping body which is of one-part or multi-part configuration and is provided with a carrying element formed by a cable and/or a wire and/or a metal chain, and at one of its ends it is connected to the fastening device and at its other end it is connected to the tensioning device, wherein the carrying element is arranged so that it encloses an acute angle with a straight line extending parallel to the axis of rotation of the discharge drum, wherein the tensioning device has a spring, preferably a helical spring, a stop for supporting the spring and a traction rod, wherein the traction rod is connected to the carrying element and has a thread which is provided with a nut or a screw having a head, and wherein by turning the nut screwed to the traction rod or the screw the carrying element is tensioned in order to pull the stripping body against the conveyor belt.

Description of Related Art

Such stripping devices are known for example from US 2004/0222065 A1 and EP 2 257 486 B1. In this case the stripping body is installed as a pre-head stripper directly below the discharge region of the belt conveyor. The stripping body is typically tensioned obliquely over the head drum (discharge drum) and thus extends along a three-dimensional curve.

The stripping devices according to the prior art which are configured in this way are designed for a specific installation position, in which the longitudinal axis of the stripping body or its tensionable carrying element, for example a wire cable, encloses a specific angle of inclination (installation angle) with a straight line extending parallel to the axis of rotation of the discharge drum. Since the effectiveness of the stripping body is dependent upon the tensile force (pretension), the associated installation instructions recommend the setting of a specific tensile force. In practice, however, it has been shown that the effectiveness or functioning of the stripping device is sometimes unsatisfactory, even though the tensile force, for example 2700 N, recommended in the installation instructions has been set.

The applicant has recognised that as a consequence of the setting of a specified tensile force the pressing force of the stripping body or the stripping elements provided thereon, for example hard metal elements, varies significantly depending upon the installation position and is frequently too high. The consequence of this, in particular in the case of strongly adhering, abrasive material to be conveyed, is that the stripping body wears too quickly and/or that grooves of unacceptable depth are produced in the surface of the conveyor belt by the scraping effect of the hard metal elements. Such damage can potentially lead to the conveyor belt becoming unusable and having to be replaced at considerable expense.

In view of the fact that the pressing force of the stripping body must have a defined magnitude, so that on the one hand a good stripping result is achieved and on the other hand the wear on the stripper and on the conveyor belt is minimised, the tensioning force exerted on the carrying element or the stripping body must be variable and the tensile force necessary in this connection must be known and adjustable as a function of the discharge drum diameter, the size of the stripper contact surface and in particular the installation angle, in order to obtain the most uniform possible pressing forces of the stripping body or the stripping elements provided thereon, for example hard metal elements. In this connection the type of material to be conveyed plays rather an insignificant role here, since it is only the consistency of the material to be conveyed that can make a slight change to the tensile force necessary if the stripping result is insufficient.

SUMMARY OF THE INVENTION

With this as the starting point, an object of the invention is to improve a device and a method of the type referred to above so that the necessary tensile force can be set more easily in order to achieve a good stripping result and also to minimise the wear on the conveyor belt and the stripping body.

This object is achieved by a device with the features described herein or by a method with the features described herein.

The device according to the invention is characterised in that the spring is arranged in a receptacle with which one or more adjusting means are associated, wherein the respective adjusting means has a through opening as a passage for the traction rod or the screw connected to the traction rod, and wherein the receptacle or the respective adjusting means defines a reference point or a reference plane for setting a variable tensioning force which corresponds to a desired tensile force dependent upon said acute angle (setting angle).

Accordingly the method according to the invention is characterised in that the spring is arranged in a receptacle and one or more adjusting means associated with the receptacle are provided, wherein the respective adjusting means has a through opening as a passage for the traction rod or the screw connected to the traction rod, wherein the receptacle or the respective adjusting means defines a reference point or a reference plane for setting a variable tensioning force, and that by means of the tensioning device a tensioning force is set which corresponds to a desired tensile force dependent upon said acute angle (setting angle).

The adjusting means or adjusting elements may also be designated as tensile force changing elements. The through opening of the respective adjusting means (adjusting element) is designed so that the traction rod or the screw connected to the traction rod is passed through the through opening with a clearance.

By the solution according to the invention the tensile force can be set in order to achieve a good stripping result and to minimise the wear on the conveyor belt and stripping body in a substantially simpler manner than in the prior art.

The traction rod can be designed for example as a threaded rod or as a rod with an internal thread, in particular as a threaded tube.

A preferred configuration of the device according to the invention is characterised in that the adjusting means is constructed in the form of a cap and is movable relative to the receptacle. According to a further preferred embodiment the adjusting means extends over the receptacle and has a recess which provides a clear view of a front edge of the receptacle facing away from the stop, wherein the adjusting means is provided with markings which are associated with different tensioning force values or different values of said acute angle. This configuration enables a particularly simple and convenient setting of the necessary tensile force in order to achieve a good stripping result and also to minimise the wear on the conveyor belt and the stripping body.

Another advantageous embodiment of the device according to the invention provides that the receptacle has an open front face or front edge facing away from the stop, wherein the one or more adjusting means form with the spring a component arrangement in which the spring is axially inserted, wherein the spacing between the stop and the front face or front edge is dimensioned so that at a variable tensioning force which is set by means of the tensioning device and corresponds to a desired tensile force which is dependent upon said angle, the end of the spring or the component arrangement facing away from the stop finishes flush with the front face or front edge or has substantially the same desired spacing relative to the front face or front edge. This configuration offers the advantage that the setting of the necessary tensile force in order to achieve a good stripping result and also to minimise the wear on the conveyor belt and the stripping body can be controlled relatively simply.

A further embodiment of the device according to the invention is characterised in that the receptacle has an open front face or front edge facing away from the stop, wherein the one or more adjusting means axially lengthen the receptacle and thus define the distance of the front face or front edge from the stop, wherein the spacing between the stop and the front face or front edge is dimensioned so that at a variable tensioning force which is set by means of the tensioning device and corresponds to a desired tensile force which is dependent upon said angle, the end of the spring or a component arrangement in which the spring (9) is axially inserted is facing away from the stop and finishes flush with the front face or front edge or has substantially the same desired spacing relative to the front face or front edge. This configuration also offers the advantage that the setting of the necessary tensile force in order to achieve a good stripping result and also to minimise the wear on the conveyor belt and the stripping body can be controlled relatively simply.

Likewise a preferred embodiment of the method according to the invention is characterised in that by means of the one or more adjusting means the receptacle is axially lengthened or a component arrangement including the spring is formed, in which the spring is axially inserted and of which the axial extent is variable by means of the one or more adjusting means, and that by means of the tensioning device a tensioning force is set which corresponds to a desired tensile force which is dependent upon said angle (setting angle), wherein the end of the spring or the end of the component arrangement facing away from the stop finishes flush with a front face or front edge of the receptacle facing away from the stop or flush with a front face or front edge of the adjusting means facing away from the stop or has substantially the same desired spacing relative to the front face or front edge.

The invention is based in particular on the idea that as a function of the installation angle of the stripping body or of its carrying element a predetermined adjusting element consisting of a plurality of adjusting elements of different thicknesses or a predetermined plurality of identical adjusting elements is combined with the spring of the tensioning device to form a component group (which may also be designated as a block or component arrangement of abutting tensioning elements), wherein a specified reference point is associated with this component group, on which it is possible by simple visual checking to determine whether the necessary tensioning force, which corresponds to a desired tensile force dependent upon the respective installation angle, is set. In this case the reference point preferably consists of the open front face of a receptacle, for example a tube or hollow body, in which the spring is arranged.

A further advantageous embodiment of the device according to the invention and of the method according to the invention is characterised in that the adjusting means consist of a plurality of adjusting elements in the form of bushings or annular discs, of which at least one is arranged in series with the spring between the stop and the nut or the screw head and together with the spring defines the component group.

In particular it is proposed that the adjusting elements are designed as bushings, preferably as collar bushings, or are provided in the form of bushings, preferably collar bushings, wherein the bushings differ from one another with regard to their thickness, and wherein the thickness of the respective bushing depends upon the angle which the carrying element encloses or should enclose with the straight line extending parallel to the axis of rotation of the discharge drum. By the use of the bushing which is associated with a specific installation angle which comes closest to the effective installation angle of the carrying element relative to the straight line extending parallel to the axis of rotation of the discharge drum, the tensile force which is required at the effective installation angle in order to achieve a good stripping result with minimal wear of the stripping body as well as of the conveyor belt can be set simply and quickly.

In this connection a further preferred embodiment of the device according to the invention as well as of the method according to the invention provides that the bushings are provided with a marking, for example in the form of an impression or engraving, wherein the respective marking designates the angle which the carrying element encloses or should enclose with the straight line extending parallel to the axis of rotation of the discharge drum. For the fitter of the stripping device such a marking considerably simplifies the selection of the bushing to be used for setting the correct or best suited tensile force.

Preferably in this connection according to a further embodiment of the method according to the invention a table or a diagram is provided, in which a plurality of angles are specified, wherein one of the thicknesses or markings of the bushings is associated with the respective angle. In order for this table or this diagram to be always available for a fitter or a maintenance operative, a further embodiment of the stripping device according to the invention provides that the tensioning device is provided with such a table or such a diagram. For this purpose the table or the diagram is for example applied to the tube or hollow body surrounding the spring, preferably impressed or engraved into the outer face of the tube/hollow body.

A variant of the solution according to the invention which is likewise advantageous is characterised in that the adjusting elements are designed as annular discs of the same thickness or are provided in the form of such discs. This variant makes it possible for the tensile force, which is required as a function of the actual installation angle in order to achieve a good stripping result with minimal wear of the stripping body as well as of the conveyor belt, to be set particularly appropriately in each case. In this case the degree of accuracy of fit which can be achieved increases with a decreasing thickness of the respective disc, but then if required a relatively large number of discs must be used.

In connection with the use of annular discs of the same thickness as tensile force changing elements, a table or a diagram is preferably (likewise) provided, in which (again) a plurality of angles are specified, wherein a number is associated with the respective angle and specifies the number of annular discs to be inserted into the tensioning device as a function of the angle which the carrying element encloses or should enclose with the straight line extending parallel to the axis of rotation of the discharge drum.

Furthermore, it is also proposed with regard to this variant that the tensioning device is provided with such a table or such a diagram. For this purpose the table or the diagram can again be applied to the tube or hollow body surrounding the spring, preferably impressed or engraved into the outer face of the tube/hollow body. Thus the table or the diagram is always available for a fitter or a maintenance operative.

A further advantageous variant of the solution according to the invention is characterised in that the adjusting means consist of a plurality of sleeves of different lengths, wherein the respective sleeve can be fitted onto the receptacle of the spring or can be inserted into the receptacle of the spring, wherein the extent of fitting on or insertion of the sleeve is limited by the stop for the spring or another stop, which is provided on the receptacle, and wherein the respective sleeve in the fitted state constitutes or defines the front face of the receptacle. This variant also makes it possible for the tensile force, which is required as a function of the actual installation angle of the stripping body in order to achieve a good stripping result with minimal wear of the stripping body as well as of the conveyor belt, to be set very appropriately in each case.

For this purpose the sleeves are preferably provided with a marking, wherein the respective marking designates the angle (installation angle) which the carrying element encloses with the straight line extending parallel to the axis of rotation of the discharge drum.

In connection with the use of such sleeves as adjusting means the tensioning device is preferably provided with a table or a diagram in which a plurality of angles are specified, wherein one of the lengths or markings of the sleeves is associated with the respective angle.

A further variant of the solution according to the invention is characterised in that the adjusting means is designed as a sleeve which is axially movably connected to the receptacle of the spring, wherein the respective sleeve in the fitted state constitutes or defines the front face of the receptacle, and wherein the receptacle is provided with markings which are associated with the various values of the said angle (installation angle). In this connection the sleeve and the receptacle are preferably connected to one another by a threaded connection. This variant offers the advantage that only one single adjusting means is required, but nevertheless in a simple manner the spacing of the front face of the receptacle relative to the stop of the spring can be changed as a function of the respective installation angle of the stripping body or carrying element, in order then to set the tensile force appropriately as a function of the installation angle. In this case the appropriate setting of the tensile force can again be easily checked, by visual checking whether the end of the spring facing away from the stop finishes flush with the front face of the receptacle or has substantially the same desired spacing relative to the front face of the receptacle.

In a particularly preferred embodiment of the device according to the invention the stripping body is provided with a lift-off element formed by a cable, a wire and/or a metal chain, which extends spaced apart from the carrying element through the stripping body and supports the stripping body when it is displaced in the belt running direction. In this way the stripping body can be optimally adapted to the belt surface and with careful treatment of the conveyor belt an improved or particularly good cleaning effect can be achieved.

For this purpose the lift-off element is preferably connected by one of its ends to the fastening device and by its other end to a second tensioning device. In a further embodiment this second tensioning device may have a configuration corresponding to the tensioning device to which the carrying element is connected.

BRIEF DESCRIPTION OF THE DRAWINGS

The invention is explained in greater detail below with reference to drawings which show several embodiments. In the schematic drawings:

FIG. 3 shows a tensioning device for a carrying element or lifting element according to FIG. 1 or FIG. 2, in a partially sectional longitudinal view;

FIG. 4 shows a plurality of adjusting elements (tensile force changing elements) in the form of collar bushings of different thicknesses, in side view, wherein the thickest collar bushing is also shown in a front end view;

FIG. 5 shows a table in which various installation angles of the stripping body or the carrying element and the collar bushing or collar bushing thickness to be used at the respective installation angle are specified;

FIG. 6 shows the tensioning device of FIG. 3 in a tensioned state which corresponds to a desired tensioning force;

FIG. 7 shows another tensioning device for a carrying element or lift-off element according to FIG. 1 or FIG. 2, in a partially sectional longitudinal view;

FIG. 8 shows an adjusting element (tensile force changing element) in the form of an annular disc in a view of an axial front face;

FIG. 9 shows a table in which various installation angles of the stripping body or the carrying element and the number of adjusting elements (tensile force changing elements) according to FIG. 8 to be used at the respective installation angle are specified;

FIG. 10 shows the tensioning device of FIG. 7 in a tensioned state which corresponds to a desired tensioning force;

FIG. 11 shows a further embodiment of a tensioning device for a carrying element or lift-off element according to FIG. 1 or FIG. 2, in a partially sectional longitudinal view;

FIG. 12 shows another embodiment of a tensioning device for a carrying element or lift-off element according to FIG. 1 or FIG. 2, in a partially sectional longitudinal view;

FIG. 13 shows a plurality of adjusting elements (tensile force changing elements) in the form of sleeves of different lengths, in side view;

FIG. 14 shows a table in which various installation angles of the stripping body or the carrying element and the sleeve or sleeve length to be used at the respective installation angle are specified;

FIG. 15 shows another embodiment of a tensioning device for a carrying element or lift-off element according to FIG. 1 or FIG. 2, in a longitudinal view; and FIG. 16 shows the tensioning device according to FIG. 15 in a partially sectional longitudinal view.

DETAILED DESCRIPTION OF THE INVENTION

Figure 1:
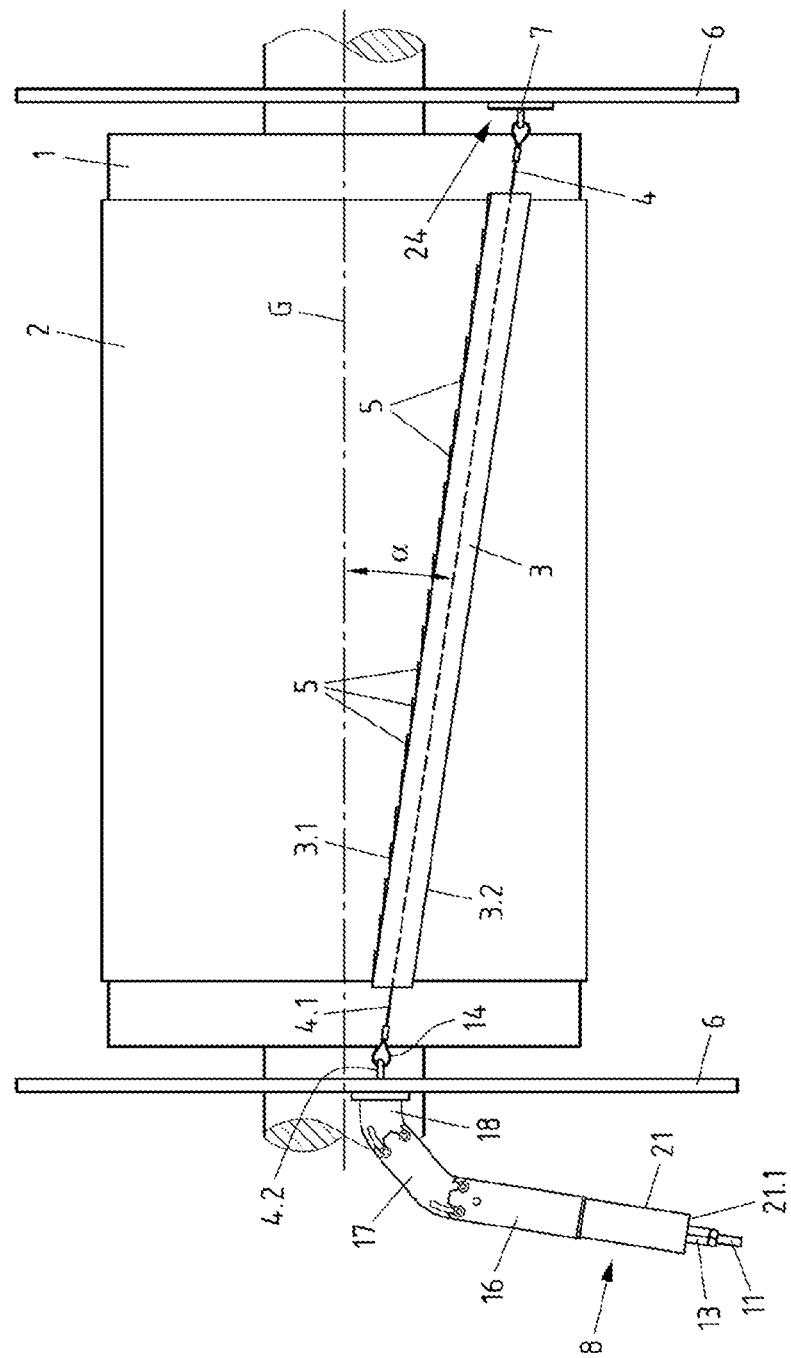
FIG. 1 shows a front view of a discharge drum of a belt conveyor with a stripping device, of which the stripping body is provided with a carrying element, for example a wire cable, and is pulled against the conveyor belt along a three-dimensional curve.
Figure 2:
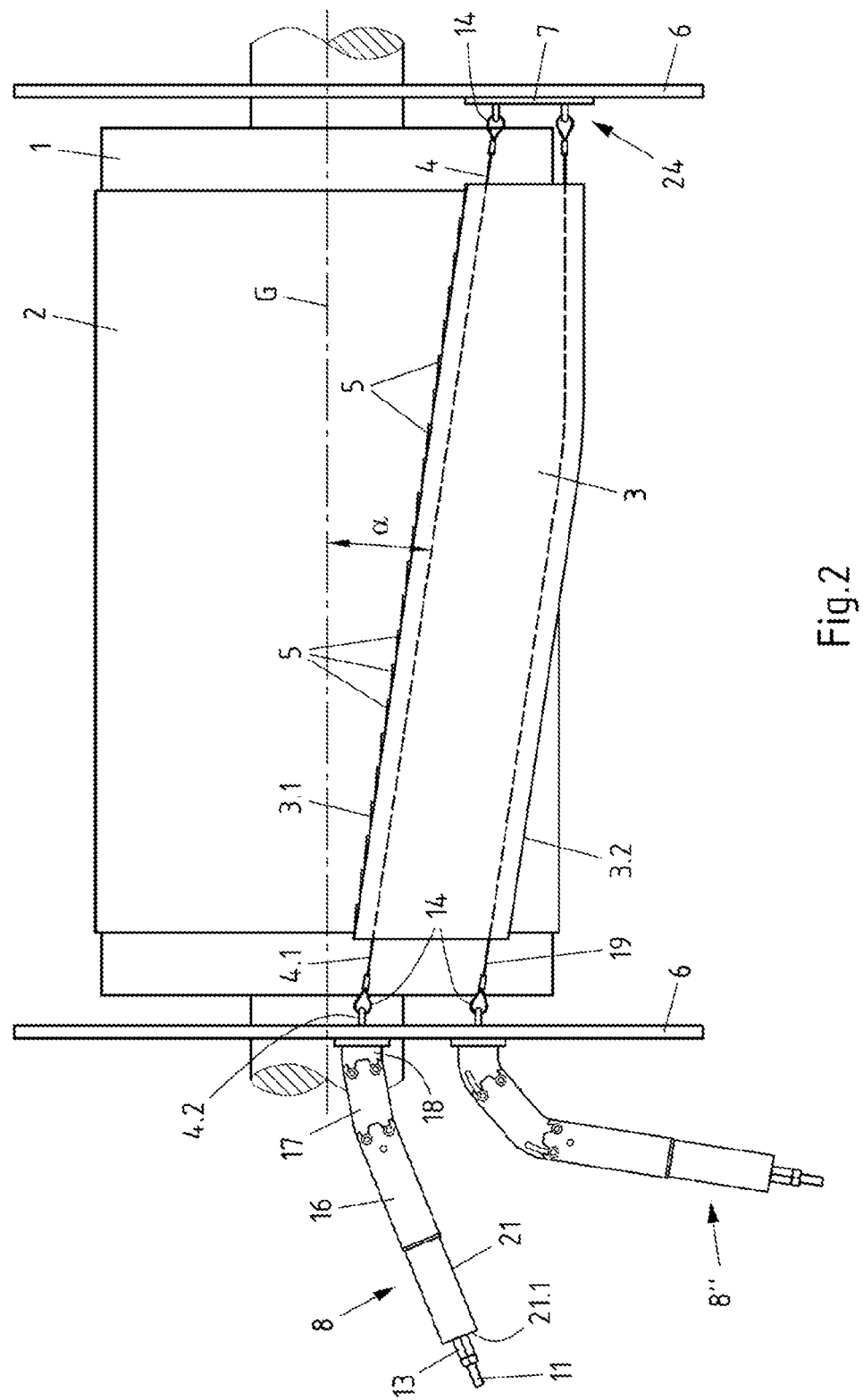
FIG. 2 shows a front view of a discharge drum of a belt conveyor with a stripping device, of which the stripping body is provided with a carrying element, for example a wire cable, and a lifting element, for example a wire cable, and is pulled against the conveyor belt along a three-dimensional curve.

A discharge drum 1 of a belt conveyor is illustrated in FIGS. 1 and 2. The belt conveyor is intended for example for the transport of coal, rocks, soil or other bulk materials. A stripping body 3 of one-part or multi-part configuration is arranged on the curve of the discharge drum 1 surrounded by the belt, namely below the region where the material to be conveyed (not shown) is discharged from the conveyor belt 2. Material to be conveyed which is adhering to the belt 2 is separated from the belt 2 by the stripping body 3.

The stripping body 3 is produced from resilient material, preferably plastic and/or elastomer. It is provided with a carrying element 4, which is formed for example from a wire and/or a wire cable and/or a metal chain. By means of the carrying element 4 the stripping body 3 is pulled against the conveyor belt 2 which is turned around by the discharge drum 1.

The stripping body 3 has two edge regions 3.1, 3.2 facing the conveyor belt, of which at least the upper edge region, i.e. the first edge region 3.1 when viewed in the running direction of the conveyor belt, is formed by a plurality of stripping elements 5. The stripping elements 5 are made from a material which has an increased wear resistance by comparison with the material of the stripping body 3. The stripping elements (wear elements) 5 are preferably made from hard metal and/or ceramic. The stripping elements 5 can be connected in various ways to the resilient material of the stripping body 3.

The carrying element 4 is connected by cohesive bonding or by positive engagement to the stripping body 3. For connection by positive engagement a tubular or hose-like passage through which the carrying element 4 extends is embedded in the stripping body 3.

The stripping body 3 is fitted to the belt conveyor so that it extends obliquely with respect to the belt running direction. In this case the carrying element 4 of the stripping body or the upper edge of the stripping body 3 encloses an angle (installation angle) α in the range from approximately 10° to 25° with a straight line G extending parallel to the axis of rotation of the discharge drum 1.

For this purpose the carrying element 4 is fitted to a support frame of the belt conveyor or to side cladding panels (side parts) 6, which are attached to the support frame in the region of the rotary bearing of the discharge drum 1. One end of the carrying element 4 is fastened to a fixed point 7, whilst the other end of the carrying element 4 is connected to a tensioning device 8. The tensioning device 8 comprises a spring 9, preferably a compression spring, for example a helical spring, a stop 10 for supporting the spring 9 and a traction rod 11, wherein the traction rod 11 is configured for example as a threaded rod. The traction rod (threaded rod) 11 is preferably connected by means of a connecting piece 12 to the carrying element 4 and is provided with a nut 13 on a portion spaced apart from the stop 10.

The connecting piece 12 is designed for example as a connecting adapter or a chain shortening claw for a metal chain 4.2, one end of which is connected via a rope thimble 14 with a wire cable 4.1 which as part of the carrying element 4 extends through a hose cast into the material of the stripping body 3 or extends into a corresponding channel-shaped recess. The connecting piece 12 has a claw 12.1 for attaching the end of the metal chain 4.2 facing away from the rope thimble 14. The claw 12.1 is connected in an articulated manner to an articulation lug 12.2 formed integrally on a nut 12.3 screwed onto the threaded rod. The nut 12.3 is combined with or secured by a lock nut 15.

The claw 12.1 is received between metal webs 16 which are preferably mounted by means of further metal webs 17 on the support frame or on one of the side cladding panels 6 of the belt conveyor. The metal webs 16 are pivotably connected to the further metal webs 17 and can be fixed, for example locked thereon. Thus the tensioning device 8 can be bent relative to the belt conveyor, so that it does not project disruptively therefrom or is more easily accessible for setting purposes. The further metal webs 17 are preferably also pivotably connected by means of an articulation socket 18 to the support frame or the side wall 6 of the belt conveyor and can be fixed relative to the articulation socket 18.

The tensioning device 8 is designed so that in the tensioned state, which corresponds to a desired tensioning force, the spring 9 is further compressed if necessary if for example a stone or foreign body seated in the conveyor belt 2 and projecting therefrom presses with a specific force against the stripping body 3.

The exemplary embodiment illustrated in FIG. 2 differs from the example illustrated in FIG. 1 in that the stripping body 3 is provided with a lift-off element 19 in addition to the carrying element 4. The lift-off element 19 is preferably designed like the carrying element 4. Thus it can likewise be formed by a wire cable, a wire and/or a metal chain.

The carrying element 4 and the lift-off element 19 extend spaced apart from one another through the stripping body 3. The carrying element 4 is preferably arranged close to the upper edge region 3.1 of the stripping body, whereas the lift-off element 19 is arranged close to the lower edge region 3.2 of the stripping body. The carrying element 4 and the lift-off element 19 extend substantially parallel to one another within the stripping body 3. The width of the stripping body 3 or the space between the carrying element 4 and the lift-off element 19 is for example in the range from 80 mm to 280 mm depending upon the size of the scraper, which in turn is dependent upon the diameter of the discharge drum 1.

In normal operation of the stripping device the carrying element 4 supports the actual restoring forces. In the event of excessive action of force on the stripping body 3, for example due to substantial damage to the belt or due to a foreign body stuck in the conveyor belt, the stripping body 3 is displaced in the belt running direction. This is possible due to the spring 9, by means of which the carrying element 4 is fastened to a fixed point of the belt conveyor. If the stripping body 3 is displaced in the belt running direction, the lift-off element 19 begins to support weight, because it is fastened, substantially unsprung, to a further fixed point of the belt conveyor.

Because of the shape of the stripping body 3, its oblique arrangement relative to the discharge drum 1 and the arrangement of the carrying element 4 and the lift-off element 19, the tangentially acting surplus force and the reaction force generated in the stripping body 3 produce a torque which causes the stripping body 3 or a correspondingly treated part-segment of the stripping body 3 to lift off from the conveyor belt 2 and the stripping body 3 to slide away over the damaged location on the conveyor belt 2.

In order on the one hand to obtain a good stripping result and on the other hand to minimise the wear on the stripping body 3 and on the conveyor belt 2, the pressing force of the stripping elements 5 of the stripping body, which are preferably made from hard metal or ceramic, must be in a specific range and must be set appropriately by setting the tensile force (pretension) acting on the carrying element 4 by means of the tensioning device 8. The tensile force necessary in order to achieve a good stripping result with minimal wear on the conveyor belt 2 and the stripping body 3 is dependent in particular upon the installation angle α of the stripping body 3 or carrying element 4 relative to a straight line G extending parallel to the axis of rotation of the discharge drum 1. The smaller the installation angle α is, the greater the tensile force has to be.

The tensioning device 8 of the stripping device according to the invention is designed so that the setting of the tensile force necessary in order to achieve a good stripping result with the least possible wear on the conveyor belt 2 and the stripping body 3, in particular the stripping elements 5, is relatively simple and enables a simple control of the correct setting during ongoing operation. For this purpose, in the exemplary embodiment illustrated in FIGS. 3 to 6 a plurality of adjusting elements in the form of bushings $20^I$, $20^{II}$, $20^{III}$, $20^{IV}$, $20^V$, $20^{VI}$, $20^{VII}$, which differ from one another with regard to their thickness (or axial dimension), are attached to the tensioning device 8. The adjusting elements may also be designated as tensile force changing elements. The thickness of the respective bushing $20^I$, $20^{II}$, $20^{III}$, $20^{IV}$, $20^V$, $20^{VI}$, or $20^{VII}$ is a function of the installation angle α, enclosed by the carrying element 4 with a straight line G extending parallel to the axis of rotation of the discharge drum 1. The adjusting elements (tensile force changing elements) $20^I$, $20^{II}$, $20^{III}$, $20^{IV}$, $20^V$, $20^{VI}$, $20^{VII}$ are preferably designed as collar bushings. On one of their front faces they have an annular projection 20.1, which projects axially relative to the collar (flange) 20.2 and can be inserted into the open end of the spring (helical spring) 9 facing away from the stop 10.

The spring 9 of the tensioning device 8 is arranged in a receptacle 21 which has an open front face 21.1 facing away from the stop 10. The receptacle is designed for example as a tubular or sleeve-like hollow body. The receptacle 21 is attached to the housing 16 and consists for example of a tube. The housing 16 and/or the receptacle 21 are provided with the stop 10 supporting the spring 9. The stop 10 is designed for example as an annular disc. The traction rod 11 (threaded rod) having an external thread is passed through the through opening 10.1 of the stop 10.

FIG. 5 shows a table T1, in which a plurality of angles (installation angle α) are specified, wherein a specific bushing is associated with each angle, specifically one of the thicknesses or markings of the bushings $20^I$, $20^{II}$, $20^{III}$, $20^{IV}$, $20^V$, $20^{VI}$, $20^{VII}$ is associated with each angle. From the set of bushings $20^I$, $20^{II}$, $20^{III}$, $20^{IV}$, $20^V$, $20^{VI}$, $20^{VII}$ of different thickness the bushing is selected for which the associated installation angle α comes closest to the actual installation angle α of the stripping body 3 or the carrying element 4 with a straight line G extending parallel to the axis of rotation of the discharge drum 1.

In order to simplify the identification of the appropriate or suitable bushing $20^I$, $20^{II}$, $20^{III}$, $20^{IV}$, $20^V$, $20^{VI}$ or $20^{VII}$, each of the bushings $20^I$, $20^{II}$, $20^{III}$, $20^{IV}$, $20^V$, $20^{VI}$, $20^{VII}$ is provided with a specific marking K which designates the angle α associated therewith. The marking K preferably consists of a number of degrees which is impressed or engraved into the bushing $20^I$, $20^{II}$, $20^{III}$, $20^{IV}$, $20^V$, $20^{VI}$ or $20^{VII}$. In FIG. 4 the thickest bushing $20^{VII}$, which is for example approximately 34 mm thick, is marked with the number of degrees "10°". The through opening of the respective bushing, through which the end of the traction rod 11 provided with a nut 13 passes, is designated by 30.

The selected bushing $20^I$, $20^{II}$, $20^{III}$, $20^{IV}$, $20^V$, $20^{VI}$ or $20^{VII}$ is arranged in series with the spring 9 between the stop 10 and the nut 13 and together with the spring 9 defines a component group. This component group (component arrangement) can also be designated as a block, pack of tensioning elements or arrangement of adjacent tensioning elements. In the exemplary embodiment according to FIGS. 3 and 6 the selected bushing $20^{VI}$ is arranged between the spring 9 and the nut 13. The nut 13 is combined with or secured by a lock nut 22.

The spacing between the stop 10 and the open front face 21.1 of the receptacle 21 designed as a hollow body is dimensioned so that at a variable tensioning force which is set by means of the tensioning device 8 and corresponds to a desired tensile force which is dependent upon said installation angle α of the stripping body 3, the end of the component group facing away from the stop 10, namely in the case shown here the front face of the bushing $20^{VI}$ facing away from the spring 9 finishes flush with the front face 21.1 of the receptacle 21 or has substantially the same desired spacing relative to the front face of the receptacle 21 (cf. FIG. 6). This "flush" finish enables a simple visual check, in order to establish whether the stripping body 3 is functioning properly.

In the exemplary embodiment illustrated in FIG. 7 to 10, instead of collar bushings annular discs 23 of the same thickness are used as adjusting elements (tensile force changing elements) in the tensioning device 8' (cf. FIGS. 7 and 8). The thickness of the respective disc 23 is for example 2 mm. The through opening of the respective disc 23 is designated by 30.

FIG. 9 shows a table T2, in which a plurality of angles relating to different installation angles α of the stripping body 3 are specified, wherein a number is associated with each angle and specifies the number of annular discs 23 to be inserted into the tensioning device 8 as a function of the angle α which the carrying element encloses or should enclose with the straight line G parallel to the axis of rotation of the discharge drum 1.

The disc 23 or discs 23 are preferably arranged between the stop and the spring 9. The spring 9 and the disc or discs 23 in turn define a component group (i.e. an arrangement of abutting tensioning elements). A collar bushing $20^I$ with a relatively thin collar 20.2 is arranged at the end of the spring 9 facing away from the stop 10 or the discs 23, in order to be able to tension the spring 9 by turning the nut 13. Moreover, the tensioning device 8' illustrated in FIG. 7 corresponds to the tensioning device 8 in FIG. 3.

A further exemplary embodiment of a tensioning device according to the invention is illustrated in FIG. 11. The spring 9 is in turn inserted into a receptacle 21. The receptacle 21 is designed as a hollow body of variable length. For this purpose the receptacle 21 is provided with a sleeve 21.2 which serves as an adjusting element. The sleeve 21.2 is axially movably connected to the receptacle 21, wherein the sleeve 21.2 in the fitted state constitutes the front face 21.1 of the receptacle 21. The sleeve 21.2 and the receptacle 21 have a hollow cylindrical shape and are connected to one another by a threaded connection 27. The receptacle 21 is provided on its outside (outer surface) with markings 25 which are associated with different values of said installation angle α or different desired tensile forces. The markings 25 consist for example of notches, preferably annular notches. The marking 25 which is the smallest distance from the stop 10 is associated with the smallest installation angle α or the greatest desired tensile force to be set. The marking 25 which is the greatest distance from the stop 10 is associated with the greatest installation angle α or the smallest desired tensile force to be set. The end edge (front edge) 21.3 of the sleeve 21.2 facing the stop 10 serves as reference point for presetting the distance of the front face 21.1 from the stop 10, wherein the end edge 21.3 is aligned with the marking 25 associated with the respective installation angle. This means that the sleeve 21.2 is rotated relative to the part of the receptacle 21 having the markings 25 so that the end edge 21.3 ends precisely at the marking 25 associated with the existing or selected installation angle α. The through opening of the sleeve 21.2, through which the traction rod (threaded rod) 11 is guided outwards and in which in the finally fitted state the front face of the spring 9 or the front face of a washer or bushing $20^I$ should lie, is designated by 30.

For the rest, the tensioning device 8" illustrated in FIG. 11 corresponds to the tensioning device 8 in FIG. 3, so that in order to avoid repetitions reference is made to the above description of FIG. 3.

In the exemplary embodiment illustrated in FIGS. 12 to 14, instead of collar bushings (or annular discs) slip-on sleeves $26^I$, $26^{II}$, $26^{III}$, $26^{IV}$, $26^V$, $26^{VI}$, $26^{VII}$ of different lengths are used as adjusting elements (tensile force changing elements) in the tensioning device 8''' (cf. FIGS. 12 and 13). The length of the sleeve-like adjusting elements or slip-on sleeves $26^I$, $26^{II}$, $26^{III}$, $26^{IV}$, $26^V$, $26^{VI}$, $26^{VII}$ is a function of the installation angle α, enclosed by the carrying element 4 with a straight line G extending parallel to the axis of rotation of the discharge drum 1.

The front face 21.1 of the fitted slip-on sleeve $26^I$, $26^{II}$, $26^{III}$, $26^{IV}$, $26^V$, $26^{VI}$ or $26^{VII}$ facing away from the stop 10 defines the reference point for setting the tensioning device 8'''.

The lengths of the slip-on sleeves $26^I$, $26^{II}$, $26^{III}$, $26^{IV}$, $26^V$, $26^{VI}$ and $26^{VII}$ are dimensioned so that at a variable tensioning force which is set by means of the tensioning device 8''' and corresponds to a desired tensile force which is dependent upon said installation angle α of the stripping body 3, the end of the sleeve $26^I$, $26^{II}$, $26^{III}$, $26^{IV}$, $26^V$, $26^{VI}$ or $26^{VII}$ (the front face 21.1 of the sleeve $26^I$ in the example shown in FIG. 12) facing away from the stop 10, finishes flush with the front face of a washer or collar bushing $20^I$ which faces away from the stop 10 and bears directly on the end of the spring 9, or has substantially the same desired spacing relative to the front face of the washer or collar bushing $20^I$ (cf. FIG. 12). This "flush" finish enables a simple visual check, in order to establish whether the stripping body 3 is functioning properly. The through opening of the respective sleeve $26^I$, $26^{II}$, $26^{III}$, $26^{IV}$, $26^V$, $26^{VI}$ or $26^{VII}$, through which the traction rod (threaded rod) 11 is guided outwards and in which in the finally fitted state the front face of the spring 9 or the front face of a washer or bushing $20^I$ should lie, is designated by 30.

FIG. 14 shows a table T3, in which a plurality of angles (installation angles α) are specified, wherein a specific sleeve is associated with each angle, specifically one of the lengths or markings of the bushings $26^I$, $26^{II}$, $26^{III}$, $26^{IV}$, $26^V$, $26^{VI}$, $26^{VII}$ is associated with each angle. From the set of slip-on sleeves $26^I$, $26^{II}$, $26^{III}$, $26^{IV}$, $26^V$, $26^{VI}$, $26^{VII}$ of different lengths the sleeve is selected of which the associated installation angle α comes closest to the actual installation angle α of the stripping body 3 or the carrying element 4 with a straight line G extending parallel to the axis of rotation of the discharge drum 1.

In order to simplify the identification of the appropriate or suitable slip-on sleeve $26^I$, $26^{II}$, $26^{III}$, $26^{IV}$, $26^V$, $26^{VI}$ or $26^{VII}$, each of the sleeves $26^I$, $26^{II}$, $26^{III}$, $26^{IV}$, $26^V$, $26^{VI}$, $26^{VII}$ is provided with a specific marking K which designates the angle α associated therewith. The marking K preferably consists of a number of degrees which is impressed or engraved into the sleeve $26^I$, $26^{II}$, $26^{III}$, $26^{IV}$, $26^V$, $26^{VI}$ or $26^{VII}$. In FIG. 13 the shortest sleeve $26^{VII}$, which is for example approximately 47 mm long, is marked with the number of degrees "10°".

In the exemplary embodiment illustrated in FIGS. 15 and 16 the adjusting element or adjusting means 28 is constructed in the form of a cap and is displaceable relative to the receptacle 21. The adjusting means 28 may for example be composed of a tubular portion and a cover 28.2, wherein the cover 28.2 is welded, bonded or firmly connected to an end of the tubular portion. The cover-like portion 28.2 may also be formed in one piece with the tubular portion. The cover or portion 28.2 of the adjusting means has a through opening 30, through which the traction rod (threaded rod) 11 is guided outwards. The adjusting means 28 is gripped between the end of the spring 9 facing away from the stop 10 and the nut 13.

The adjusting means 28 in the form of a cap extends over the sleeve-like receptacle 21, into which the spring 9 is inserted. The length of the sleeve-like receptacle 21 is dimensioned so that it is shorter than the length of the spring 9. Thus the end of the spring 9 facing away from the stop 10 projects beyond the front edge 21.1 of the receptacle 21 and extends as far as the inner face of the cover 28.2 of the adjusting means 28 in the form of a cap.

The tubular section of the adjusting means 28 has a window-like recess 28.1, so that the end of the sleeve-like receptacle 21 facing away from the stop 10 and thus in particular the front edge 21.1 of the receptacle 21 is visible. The outer face of the tubular section of the adjusting means 28 is provided with markings 25', for example notches or ribs, which are associated with different tensioning force values or different values of said setting angle α. In the example illustrated in FIG. 15 the markings 25' are provided with figures which specify values of the adjustable tensioning forces in kilonewtons (kN). The reference point for setting the variable tensioning force is the visible front edge 21.1 of the sleeve-like receptacle 21. The recess 28.1 is preferably designed as a longitudinal hole.

For the rest, the tensioning device 8''' illustrated in FIGS. 15 and 16 corresponds to the tensioning device 8 in FIG. 3, so that in order to avoid repetitions reference is made to the above description of FIG. 3.

When a stripping body 3 according to FIG. 2 is used, which in the region of the curve of the discharge drum 1 is pulled against the conveyor belt 2 by a carrying element 4 and a lift-off element 19 extending parallel thereto, the lift-off element 19 is preferably also mounted by means of a tensioning device 8'' on the support frame or a side cladding panel (side wall) 6 of the belt conveyor (cf. FIG. 2). The tensioning device 8'' associated with the lift-off element 19 is preferably of the same structural design as the tensioning device 8 or 8' associated with the carrying element 4.

The fastening device 24 for attachment of the end of the carrying element 4 facing away from the tensioning device 8, 8', 8'' and also of the corresponding end of the lift-off element 19 constitutes a fixed point 7. The fastening device 24 is mounted on the support frame or the inner face of the side wall 6 of the belt conveyor.

The implementation of the invention is not limited to the exemplary embodiments illustrated in the drawings. On the contrary, further variants are conceivable which also, in a configuration different from these examples, make use of the invention specified in the claims. For example, the traction rod 11 designed as a threaded rod with the nut 13 can be replaced by a traction rod having a drilled hole with an internal thread or a tube having an internal thread and a screw screwed therein. Furthermore, instead of the slip-on sleeves $26^I$, $26^{II}$, $26^{III}$, $26^{IV}$, $26^V$, $26^{VI}$, $26^{VII}$ corresponding insert sleeves can also be used, wherein the respective insert sleeve together with the spring 9 disposed therein is inserted into the tubular receptacle 21.

The invention claimed is:

1. A device for stripping material from a conveyor belt of a belt conveyor in a region of a curve of a discharge drum below the discharge point of the belt conveyor, the device comprising a stripping body which is of a one-part or multi-part configuration and is provided with a carrying element formed by a cable, a wire, or a metal chain, such that the stripping body is or can be pulled against the conveyor belt; a fastening device; and a tensioning device for the carrying element, wherein in an installed state the carrying element is arranged so that it encloses an acute angle with a straight line extending parallel to an axis of rotation of the discharge drum, and at one of its ends it is connected to the fastening device and at its other end it is connected to the tensioning device, wherein the tensioning device has a spring, a stop for supporting the spring and a traction rod, and wherein the traction rod is directly connected to the carrying element and has a thread which is provided with a nut or a screw having a head, wherein the spring is arranged in a receptacle associated with one or more adjusting means configured to adjust a tensile force of the traction rod, wherein respective adjusting means have a through opening as a passage for the traction rod or the screw connected to the traction rod, wherein the traction rod is received within the spring, and wherein the receptacle or the respective adjusting means defines a reference point or a reference plane for setting a variable tensioning force which corresponds to a desired tensile force dependent upon said acute angle.

2. The device according to claim 1, wherein the adjusting means is a cap and is movable relative to the receptacle.

3. The device according to claim 2, wherein the adjusting means extends over the receptacle and has a recess which provides a clear view of a front edge of the receptacle facing away from the stop, wherein the adjusting means is provided with markings which are associated with different tensioning force values or different values of said acute angle.

4. The device according to claim 1, wherein the receptacle has an open front face or front edge facing away from the stop, wherein the one or more adjusting means form with the spring a component arrangement in which the spring is inserted axially, wherein the spacing between the stop and the front face or front edge is dimensioned so that at a variable tensioning force, which is set by the tensioning device and corresponds to a desired tensile force which is dependent upon said angle, the end of the spring or the component arrangement facing away from the stop finishes flush with the front face or front edge or has substantially the same desired spacing relative to the front face or front edge.

5. The device according to claim 1, wherein the receptacle has an open front face or front edge facing away from the stop, wherein the one or more adjusting means axially lengthen the receptacle and thus define a distance of the front face or front edge from the stop, wherein the spacing between the stop and the front face or front edge is dimensioned so that at a variable tensioning force, which is set by the tensioning device and corresponds to a desired tensile force which is dependent upon said angle, the end of the spring or a component arrangement, in which the spring is axially inserted, facing away from the stop finishes flush with the front face or front edge or has substantially the same desired spacing relative to the front face or front edge.

6. The device according to claim 1, wherein the adjusting means consist of a plurality of adjusting elements in the form of bushings or annular discs, of which at least one is arranged in series with the spring between the stop and the nut or the screw head and together with the spring defines a component arrangement.

7. The device according to claim 6, wherein the adjusting elements are designed as bushings, wherein the bushings differ from one another with regard to their thickness, and wherein the thickness of the respective bushing is a function of the installation angle enclosed by the carrying element with a straight line extending parallel to the axis of rotation of the discharge drum.

8. The device according to claim 7, wherein the bushings are provided with a marking, wherein the respective marking designates the angle which the carrying element encloses with the straight line extending parallel to the axis of rotation of the discharge drum.

9. The device according to claim 8, wherein the tensioning device is provided with a table or a diagram, in which a plurality of angles are specified, wherein one of the thicknesses or markings of the bushings is associated with the respective angle.

10. The device according to claim 6, wherein the adjusting elements are designed as annular discs of the same thickness.

11. The device according to claim 10, wherein the tensioning device is provided with a table or a diagram, in which a plurality of angles are specified, wherein a number is associated with the respective angle and specifies a number of annular discs to be inserted into the tensioning device as a function of the angle which the carrying element encloses with the straight line extending parallel to the axis of rotation of the discharge drum.

12. The device according to claim 1, wherein the adjusting means comprises a plurality of sleeves of different lengths, wherein the respective sleeve can be fitted onto the receptacle or can be inserted into the receptacle, wherein an extent of fitting on or insertion of the sleeve is limited by the stop or another stop which is provided on the receptacle, and wherein the respective sleeve in a fitted state constitutes the front face of the receptacle.

13. The device according to claim 12, wherein the sleeves are provided with a marking, wherein the respective marking designates the angle which the carrying element encloses with the straight line extending parallel to the axis of rotation of the discharge drum.

14. The device according to claim 13, wherein the tensioning device is provided with a table or a diagram, in which a plurality of angles are specified, wherein one of the lengths or markings of the sleeves is associated with the respective angle.

15. The device according to claim 1, wherein the adjusting means is a sleeve which is axially movably connected to the receptacle, wherein the sleeve in a fitted state constitutes the front face of the receptacle and wherein the receptacle is provided with markings which are associated with various values of said acute angle.

16. The device according to claim 15, wherein the sleeve and the receptacle are connected to one another by a threaded connection.

17. The device according to claim 1, wherein the stripping body is further provided with a lift-off element formed by a cable, a wire, or a metal chain, which extends spaced apart from the carrying element through the stripping body and supports the stripping body when it is displaced in a belt running direction.

18. The device according to claim 17, wherein the lift-off element is connected by one of its ends to the fastening device and by its other end to a second tensioning device.

19. The device according to claim 18, wherein the second tensioning device is configured to correspond to the tensioning device to which the carrying element is connected.

20. A method of fitting a stripping device for stripping material from a conveyor belt of a belt conveyor in a region of a curve of a discharge drum below the discharge point of the belt conveyor, wherein the stripping device comprises a stripping body which is of a one-part or multi-part configuration and is provided with a carrying element formed by a cable, a wire, or a metal chain, which is connected at one of its ends to a fastening device and at its other end to a tensioning device, wherein the carrying element is arranged so that it encloses an acute angle with a straight line extending parallel to an axis of rotation of the discharge drum, wherein the tensioning device has a spring, a stop for supporting the spring and a traction rod, wherein the traction rod is directly connected to the carrying element and has a thread which is provided with a nut or a screw having a head, and wherein turning the nut screwed to the traction rod or the screw the carrying element is tensioned in order to pull the stripping body against the conveyor belt, wherein the spring is arranged in a receptacle and one or more adjusting means configured to adjust a tensile force of the traction rod and associated with the receptacle are provided, wherein respective adjusting means have a through opening as a passage for the traction rod or the screw connected to the traction rod, wherein the traction rod is received within the spring, and wherein the receptacle or the respective adjusting means defines a reference point or a reference plane for setting a variable tensioning force, and wherein a tensioning force is set by the tensioning device which corresponds to a desired tensile force which is dependent upon said acute angle.

21. A method according to claim 20, wherein by means of the one or more adjusting means the receptacle is axially lengthened or a component arrangement including the spring is formed, in which the spring is axially inserted and of which the axial extent is variable by means of the one or more adjusting means, and wherein a tensioning force is set by the tensioning device which corresponds to a desired tensile force which is dependent upon said angle, wherein an end of the spring or an end of the component arrangement facing away from the stop finishes flush with a front face or front edge of the receptacle facing away from the stop or flush with a front face or front edge of the adjusting means facing away from the stop or has substantially the same desired spacing relative to the front face or front edge.

* * * * *